United States Patent [19]

Fisch

[11] Patent Number: 4,958,983
[45] Date of Patent: Sep. 25, 1990

[54] INDEXING CONVEYOR FOR WORKPIECE BLANKS

[75] Inventor: Alfred C. Fisch, Clarkston, Mich.

[73] Assignee: Oakland Engineering, Inc., Pontiac, Mich.

[21] Appl. No.: 375,000

[22] Filed: Jul. 3, 1989

Related U.S. Application Data

[62] Division of Ser. No. 223,529, Jul. 25, 1988, abandoned.

[51] Int. Cl.$^5$ .............................................. B65G 57/30
[52] U.S. Cl. ............................. 414/795.3; 414/794.9; 414/788.4; 414/793.1
[58] Field of Search ............... 414/794.9, 795.3, 788.4, 414/793.1, 791.1, 792.7, 794.4

[56] References Cited

U.S. PATENT DOCUMENTS

| | | | |
|---|---|---|---|
| 3,171,550 | 3/1965 | Gajdostik et al. | 414/795.3 |
| 3,517,482 | 6/1970 | Beninger | 414/795.3 X |
| 3,895,574 | 7/1975 | Nyborg | 414/795.3 X |
| 4,390,098 | 6/1983 | Wilgus et al. | 414/795.3 X |
| 4,432,685 | 2/1984 | Stauber | 414/795.3 X |

FOREIGN PATENT DOCUMENTS

| | | | |
|---|---|---|---|
| 1133308 | 7/1962 | Fed. Rep. of Germany | 414/795.3 |
| 2249553 | 5/1973 | Fed. Rep. of Germany | 414/794.9 |
| 0243482 | 3/1987 | Fed. Rep. of Germany | 414/795.3 |
| 0203616 | 12/1982 | Japan | 414/795.3 |
| 0190286 | 6/1964 | Switzerland | 414/795.3 |
| 1144691 | 3/1969 | United Kingdom | 414/795.3 |

Primary Examiner—Joseph E. Valenza
Assistant Examiner—James R. Bidwell
Attorney, Agent, or Firm—Barnes, Kisselle, Raisch, Choate, Whittemore & Hulbert

[57] ABSTRACT

An indexing conveyor for receiving and conveying workpiece blanks comprising a base mounting a pair of horizontal chain conveyors having a series of conveying hands in laterally opposed pairs at predetermined spacing along the conveyor chains. A pair of vertical chain conveyors are positioned laterally outwardly of the horizontal conveyors and each carry a pair of workpiece-support fingers. The horizontal and vertical conveyors have chain-drive sprockets mounted on a common drive shaft and are synchronized such that workpiece blanks carried by the vertical conveyor fingers are deposited in horizontal conveyor hands as the vertical conveyor fingers travel downwardly past the horizontal conveyor. A stacker for workpiece blanks includes cam fingers carried by supports above an index position of the horizontal conveyor, and a ram for successively lifting workpieces from the horizontal conveyor against the fingers.

8 Claims, 6 Drawing Sheets

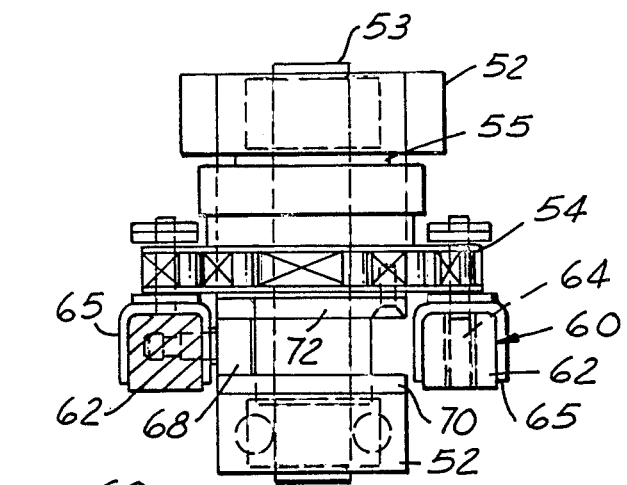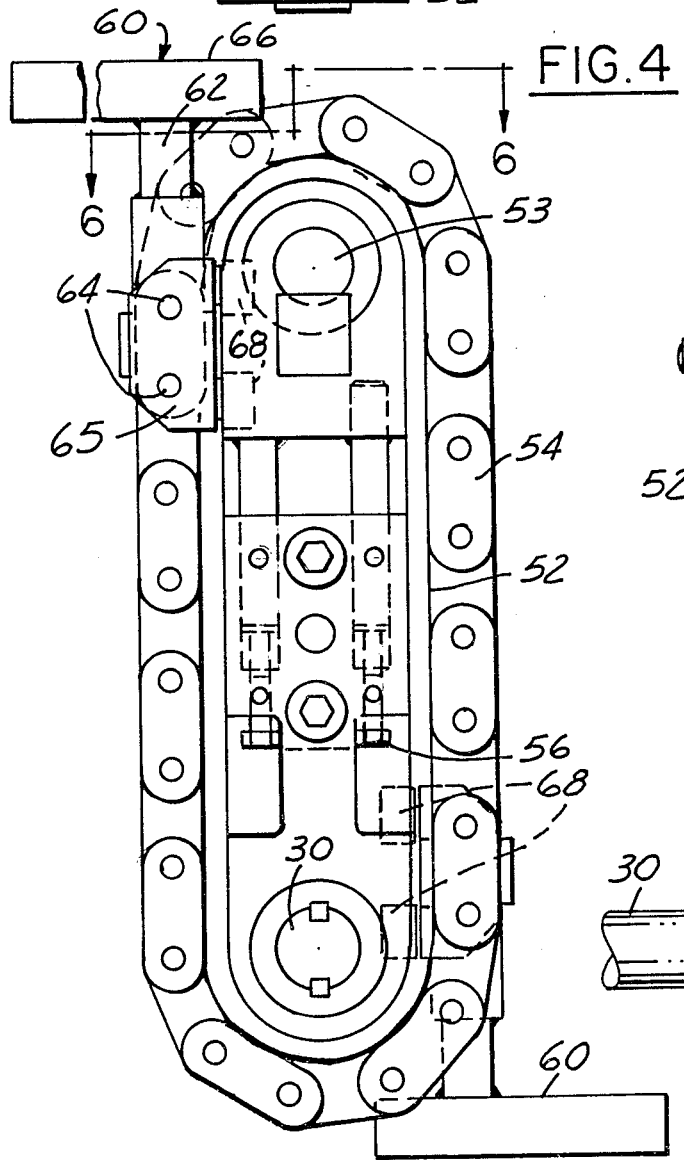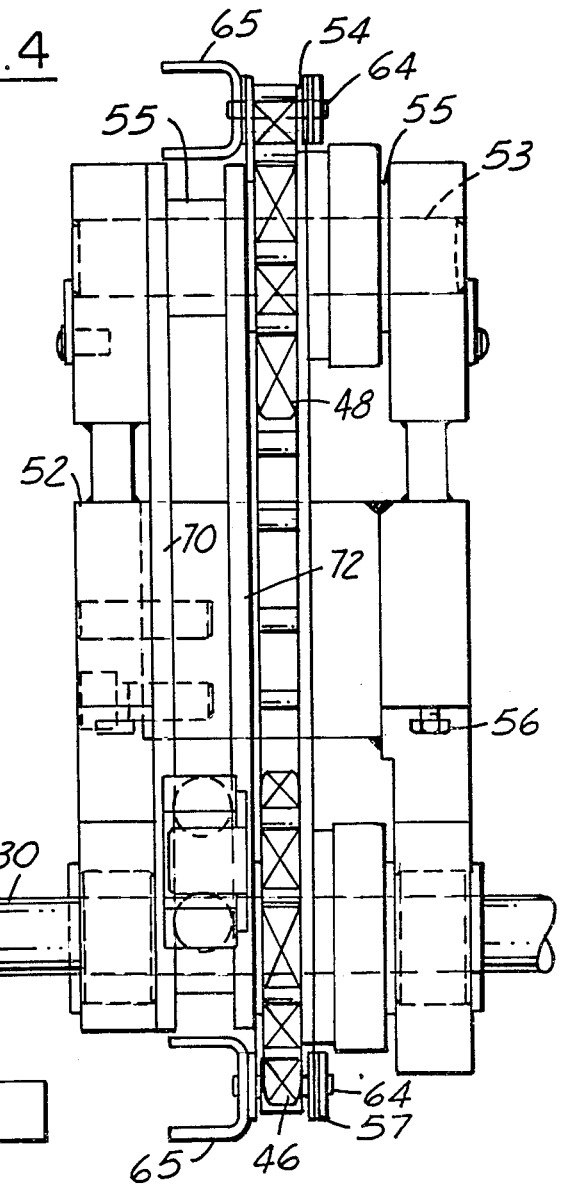

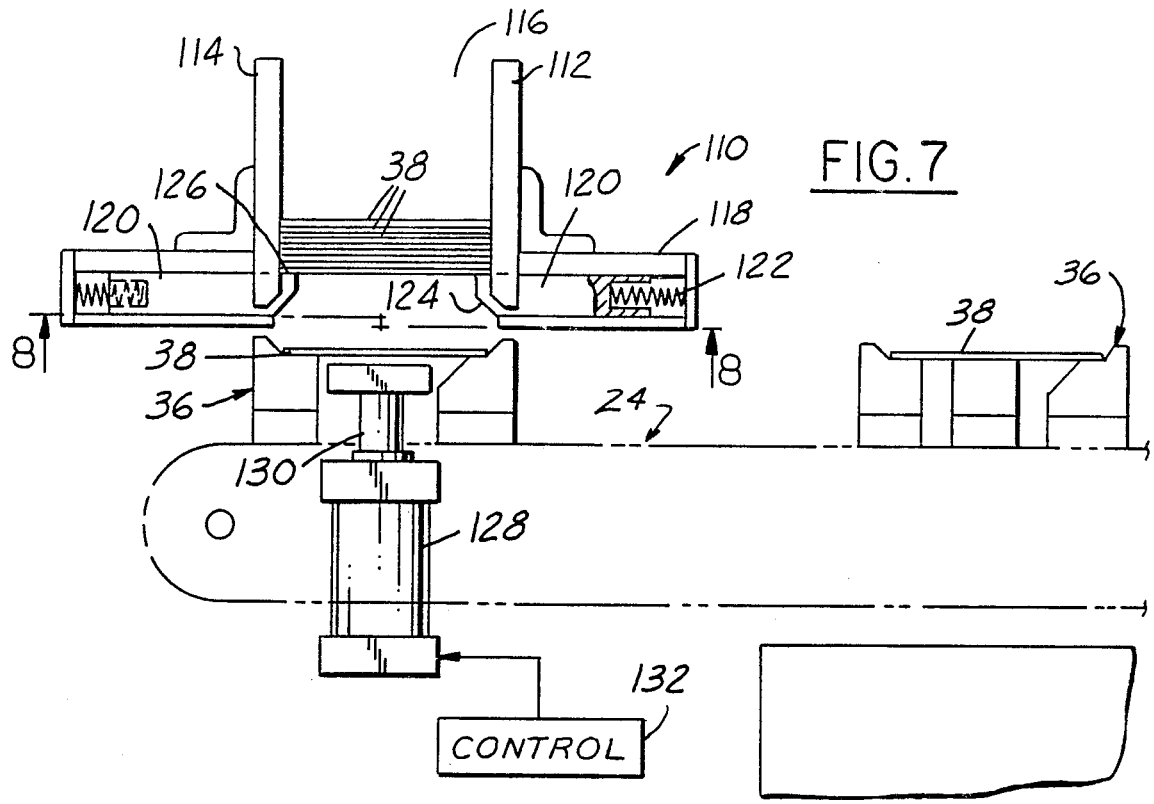
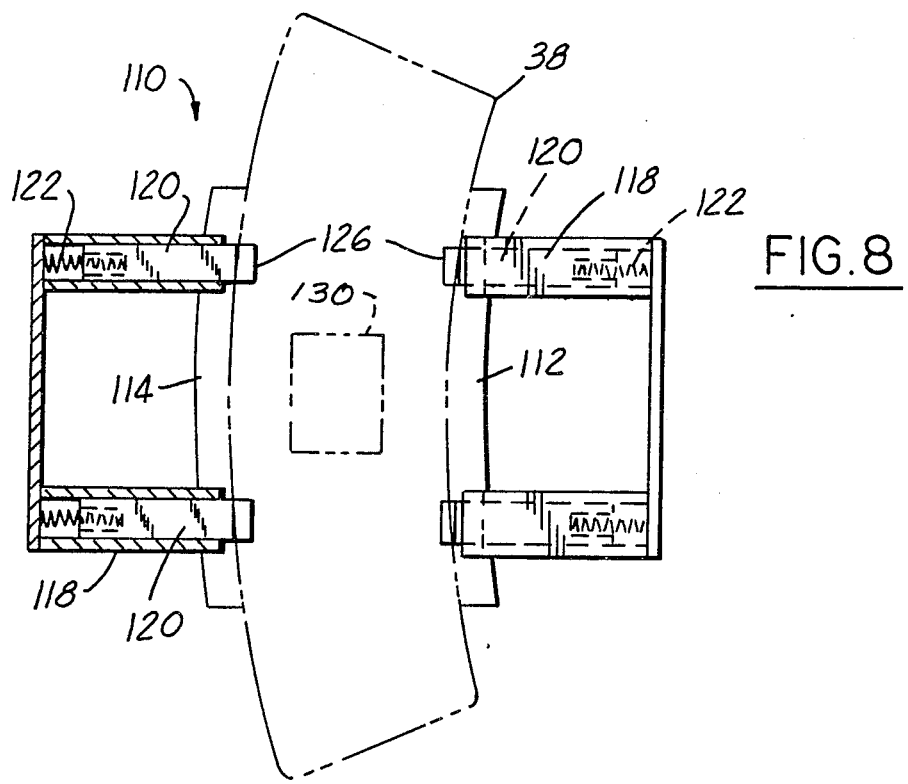

INDEXING CONVEYOR FOR WORKPIECE BLANKS

This application is a division of application Ser. No. 07/223,529 filed July 25, 1988, abandoned.

The present invention is directed to workpiece conveyors, and more particularly to a conveyor for receiving vertically descending workpiece blanks and for horizontally conveying such workpiece blanks at predetermined incremental spacing.

In many industrial blanking operations, blanks of sheet steel or the like are formed by a downwardly descending die, which simultaneously forms the blank and conveys the blank to a vertical die drop-out chute. It is an object of the present invention to provide a conveyor for receiving workpiece blanks vertically falling from such a drop-out chute, and for conveying such blanks horizontally at predetermined spacing and orientation.

The invention, together with additional objects, features and advantages thereof, will be best understood from the following description, the appended claims and the accompanying drawings in which:

FIG. 1 is a side elevational view of a workpiece blank conveyor in accordance with a presently preferred embodiment of the invention;

FIGS. 2A and 2B together comprise a top plan view of the conveyor of FIG. 1;

FIG. 4 is a side elevational view of the vertical conveyor of FIG. 1 on an enlarged scale;

FIG. 5 is an end elevational view of the conveyor in FIG. 4;

FIG. 6 is a fragmentary sectioned top plan view of the conveyor in FIG. 4, being taken substantially along the line 6—6 in FIG. 4;

FIG. 7 is a fragmentary view of a modified conveyor embodying a workpiece blank stacker in accordance with another aspect of the present invention; and FIG. 8 is a sectional view taken substantially along the line 8—8 in FIG. 7.

Figure 1:
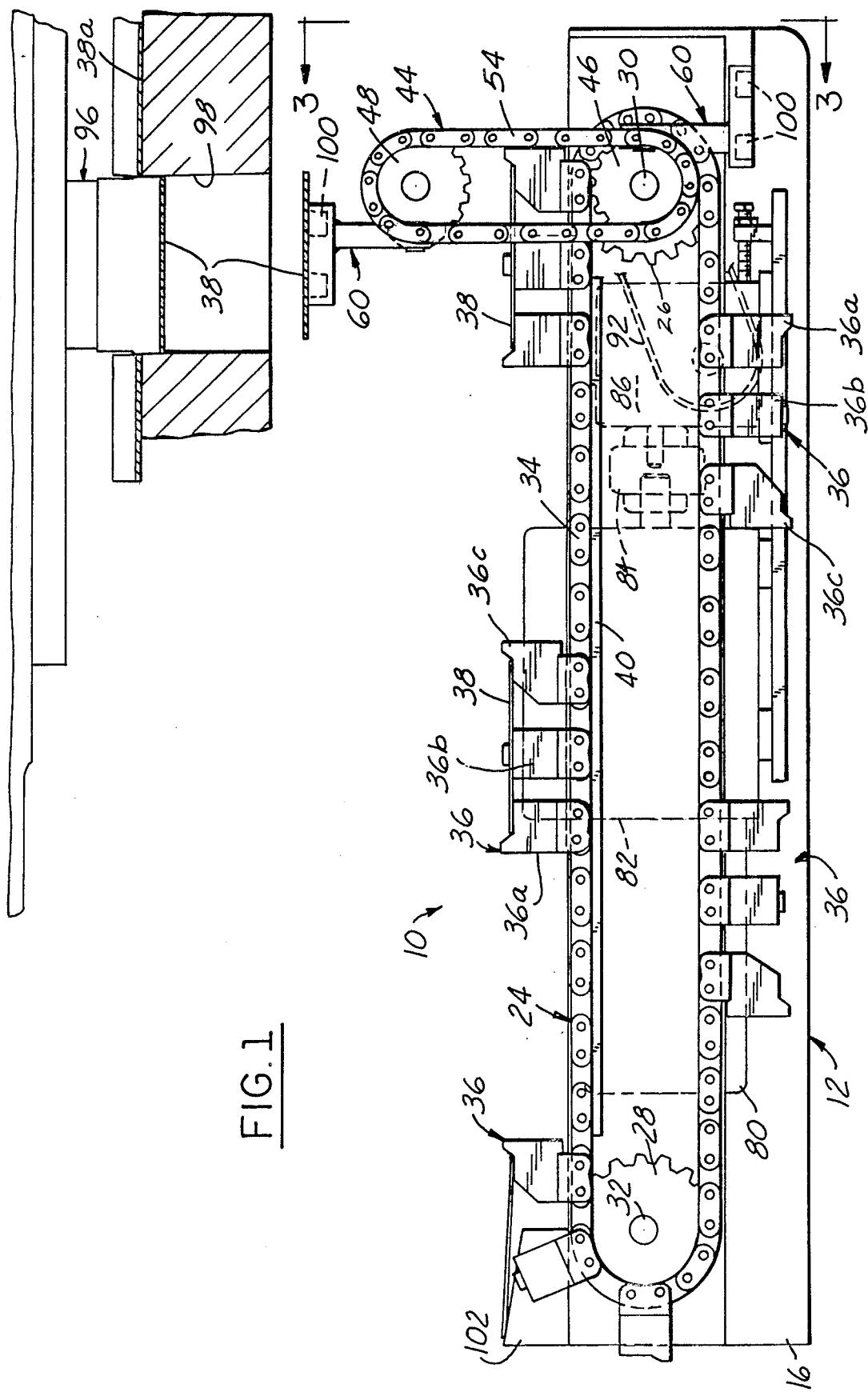
Figure 2A:
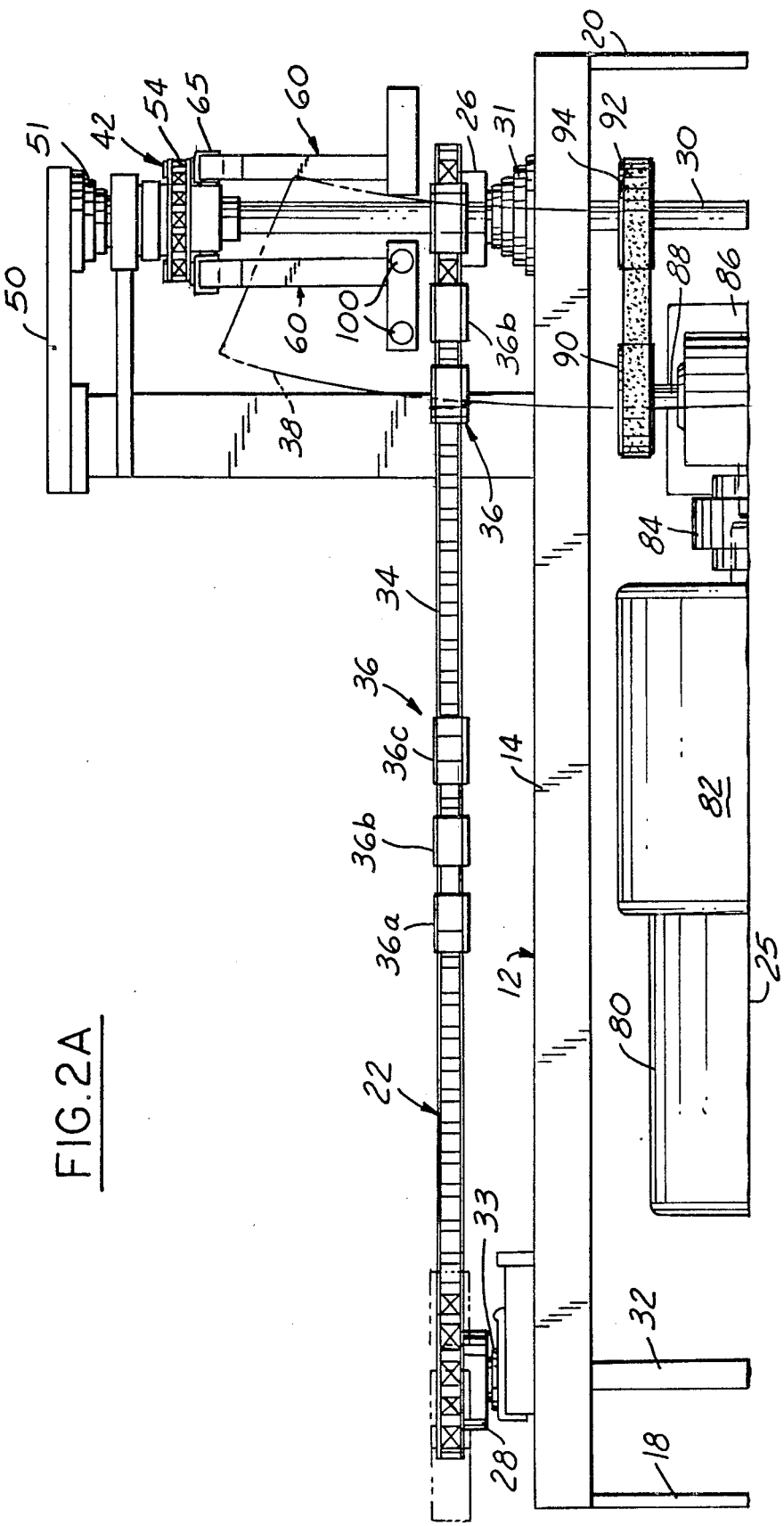
Figure 2B:
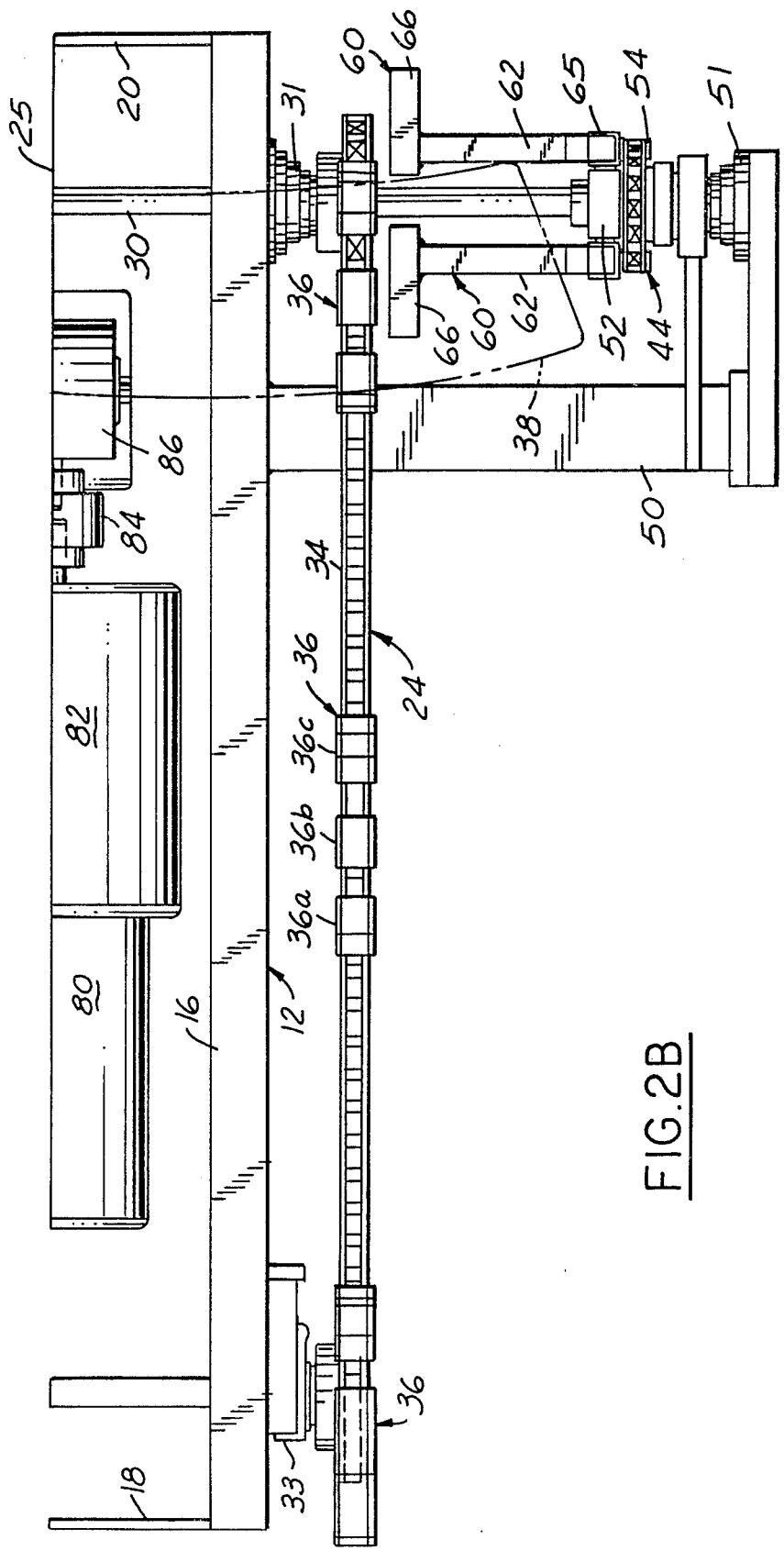
Figure 3:
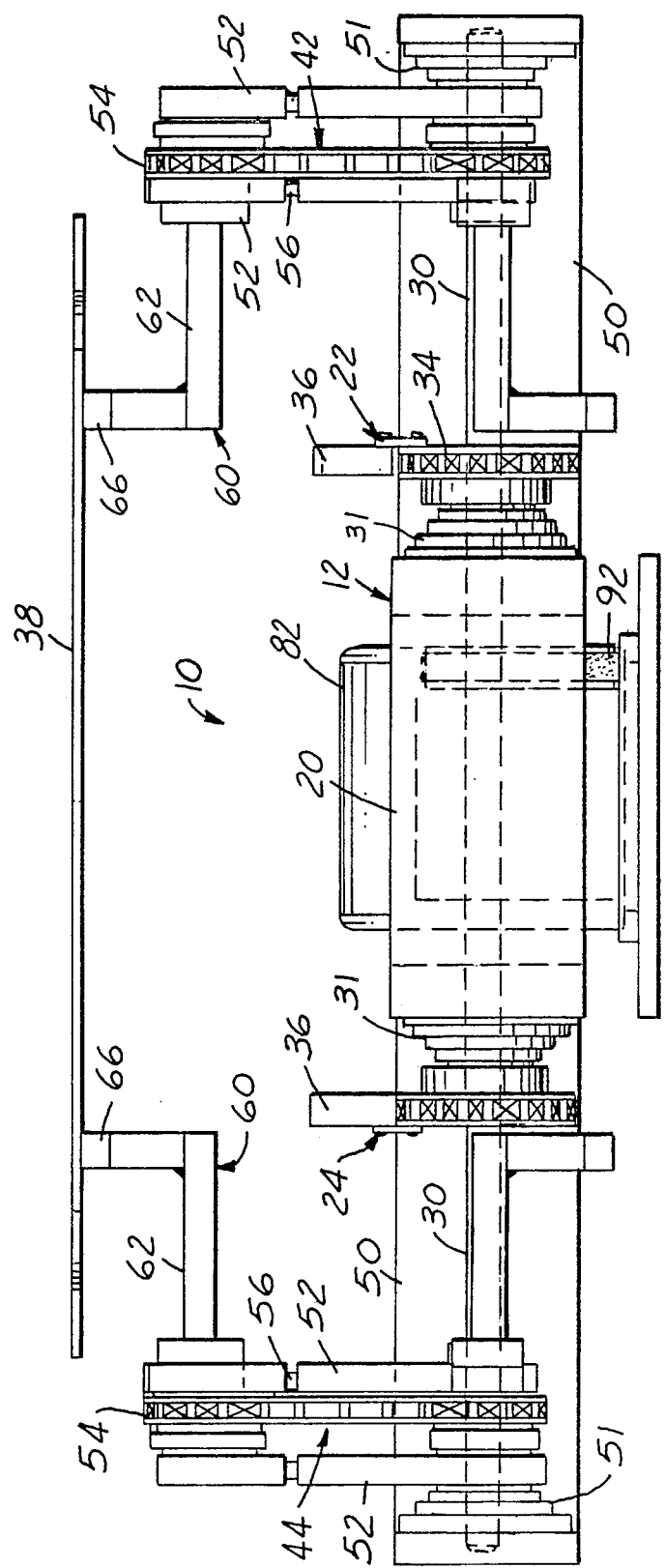
FIG. 3 is an end elevational view of the conveyor illustrated in FIGS. 1, 2A and 2B, being taken substantially from the direction 3—3 in FIG. 1.

The drawings illustrate a conveyor 10 in accordance with a presently preferred embodiment of the invention as comprising a hollow rectangular base 12 having side panels 14, 16 (FIGS. 2A and 2B) and end panels 18, 20 of suitable welded steel construction or the like. A pair of longitudinally extending horizontal chain conveyors 22, 24 are respectively mounted externally on base side panels 14, 16—i.e., on opposite sides of the conveyor centerline 25 (FIGS. 2A and 2B). Conveyor 24 (FIGS. 1 and 2B) comprises a drive sprocket 26 and an idler sprocket 28 each coupled to a respective shaft 30, 32 which is rotatably journaled on base side panels 12, 14 by bearings 31, 33. As shown in FIG. 2A, shaft 32 extends through base 12 and also carries idler sprocket 28 of conveyor 22, with the respective conveyor idler sprockets thus rotating on the common axis of shaft 32. Likewise, shaft 30 extends trough base 12 and carries drive sprocket 26 of conveyor 22, the respective drive sprockets 26 of conveyors 22, 24 thus rotating on the common axis of shaft 30. An endless chain 34 is looped around sprockets 26, 28. Conveyor 22 is the mirror image of conveyor 24.

A plurality of workpiece supports hands 36 are carried by each chain 34 in conveyors 22, 24 in a uniformly spaced array lengthwise of each chain 34 and in laterally aligned pairs as between the respective conveyors 22, 24. As best seen in FIG. 1, each workpiece support hand 36 is a multiple-segment hand, with each individual segment 36a, 36b and 36c being coupled to an associated chain link. Thus, hand segments 36a–36c are in predetermined workpiece-support configuration during travel through the upper and lower horizontal reaches of conveyors 22, 24, but separate or spread with respect to each other as each hand 36 passes in sequence over sprockets 26, 28, as best illustrated at the left-hand edge of FIG. 1. The upper edge of each hand segment 36a–36c is contoured to receive and hold a workpiece 38 of predetermined peripheral contour. A rail 40 is supported by base 12 beneath chain 34 in the upper horizontal reach of each conveyor 22, 24 for thereby supporting not only the weight of each chain 34, but also the weight of hands 36 and workpieces 38 as the latter are conveyed by chain 34 from sprocket 26 toward sprocket 28.

A pair of vertical chain conveyors 42, 44 are carried by base 12 laterally outwardly of horizontal conveyors 22, 24. Conveyor 44 includes a lower sprocket 46 mounted on shaft 30, which thus forms a common drive shaft for all of the horizontal and vertical conveyors. An idler sprocket 48 is mounted on a shaft 53 and positioned vertically above drive sprocket 46. A bracket 50 projects outwardly from base side panel 16, and has an inward bend which rotably supports the end of drive shaft 30 in a bearing 51. Idler sprocket 48 is carried by a shaft 53 rotatable within bearing 55 carried by opposed mounts 52 affixed to bracket 50. An endless chain 54 is looped around lower and upper vertical conveyor sprockets 46, 48. Mounts 52 include bolts 56 for taking up slack in the chain 54.

A pair of workpiece fingers 60 are carried by chain 54 and are uniformly spaced from each other lengthwise of chain 54. Each finger 60 has a shank 62 fastened by a pair of pins 64 within opposed arms of a U-shaped keeper 65. Keepers 65 are fastened by pins 64 to associated links of chain 54. A horizontally oriented workpiece supports leg 66 is cantilevered from the pin-remote end of each shank 62. A pair of rollers 68 are spaced from each other lengthwise of chain 54 and extend from finger shank 62 and keeper 65 between a pair of vertically extending guides 70, 72 carried by mount 52 for maintaining vertical extending orientation of finger shank 62 and horizontal orientation of leg 66. Conveyor 42 is a mirror image of conveyor 44 herein above described in detail.

Within base 12, an electric motor 80 is connected through a clutch/brake mechanism 82 and a coupler 84 to a gear reducer assembly 86. The output shaft 88 of reducer 86 is connected by a pulley 90 and a drive belt 92 to a drive pulley 94 affixed to drive shaft 30 between base side plates 14, 16. Thus, motor 80 functions through shaft 30 simultaneously to drive both horizontal conveyors 22, 24 and vertical conveyors 42, 44. Hands 36 and fingers 60 thus move in synchronism respectively along the horizontal and vertical conveyors, with the conveyors being synchronized such that the upper workpiece-carrying surfaces of fingers 60 intersect the plane of workpieces carried by hands 36 when a pair of hands 36 is positioned beneath a downwardly-descending pair of fingers 60.

In operation, conveyor 10 is illustrated in FIG. 1 as being positioned beneath a die 96 for blanking workpieces 38 from sheet stock 38a and conveying the blank workpieces downwardly through a die drop-out chute 98. Vertical conveyors 42, 44 are positioned in laterally opposed alignment beneath drop-out chute 98 so as to receive workpieces 38 falling by gravity therethrough. Where workpieces 38 are of sheet steel construction, fingers 60 preferably include magnets 100 carried adjacent to the upper workpiece-supporting surfaces of fingers 60 for enhanced capturing of workpiece blanks 38. Workpiece blanks 38, supported by laterally opposed fingers 60, are then conveyed downwardly by conveyors 42, 44, deposited on horizontal conveyors 22, 24, and then conveyed by the latter (to the left in FIG. 1) to the workpiece ramp 102. As best seen in FIGS. 2A and 2B, vertical conveyors 42, 44 are laterally spaced from each other by a distance sufficient to permit passage of workpiece 38 therebetween, fingers 60 extending inwardly to pass closely adjacent to hands 36.

Thus, in furtherance of the aforestated object of the invention, workpiece blanks 38 falling by gravity through dropout chute 98 are conveyed in sequence at predetermined increments to a workpiece utilization station, ramp 102 in the exemplary application of the invention. It will be appreciated, of course, that conveyor 10 could be operated in reverse direction—i.e., to convey workpieces 38 horizontally to the right and then vertically upwardly—without in any way altering the principles of the invention. The conveyors preferably are simultaneously incrementally indexed through operation of clutch/brake 82, although continuous operation is within the scope of the invention in its broadest aspects.

FIGS. 7 and 8 illustrate a modified embodiment of the invention wherein a workpiece stacker 110 is positioned above conveyor 24 at the downstream conveyor end in place of ramp 102 in FIG. 1. Stacker 110 comprises a pair of vertical supports 112, 114 positioned above conveyor at an index position of conveyor hands 36. Supports 112, 114 are carried in fixed position and are spaced from each other by a gap 116 of dimension and contour so as to receive and capture workpieces 38 therebetween. Slideways 118 are mounted in opposed pairs on supports 112, 114 and extent horizontally outwardly therefrom with respect to inter-support gap 116. A finger 120 is slidably carried by each way 118. A coil spring 122 is captured within each way 118 and resiliently urges the corresponding finger 120 into gap 116. The spring-remote end of each finger 120 includes a downwardly-facing sloping cam surface 124 and a flat upper surface 126, the surfaces 126 of all fingers 120 being coplaner. A cylinder 128 is positioned beneath conveyor 24 centrally of gap 116 and has a ram 130 for selectively engaging and lifting workpieces 38 from hands 36. Cylinder 128 is coupled to a suitable control mechanism 132.

In operation, when conveyor 24 is indexed and stopped with a set of hands 36 and a workpiece 38 positioned beneath stacker 110, cylinder 128 and ram 130 are activated by control 132. The workpiece 38 is thus lifted by ram 130 so as to engage cam surfaces 124 of fingers 120 and thereby urge fingers 120 out of gap 116 against the forces of associated springs 122. When workpiece 38 has cleared fingers 120, the fingers return to their normal positions illustrated in FIG. 7. Ram 130 is then retracted and workpiece 38 is support by surfaces 126. Thus, successive workpieces 38 are lifted and stacked within gap 116 between supports 112, 114, and may later be removed by any suitable means.

The invention claimed is:

1. Apparatus for stacking preformed workpiece blanks comprising:
    conveyor means for indexingly transporting preformed workpiece blanks to a stacker station,
    a pair of opposed support means carried above said conveyor means at said workpiece station, said pair of support means being separated by a gap to permit stacking of workpiece blanks therebetween,
    finger means slidably carried by each of said support means for lateral motion with respect to said gap, each of said finger means having cam surface means facing said conveyor means,
    spring means urging each said finger means into said gap, and
    means positioned beneath said conveyor means at said stacker station for raising a workpiece blank against force of said cam surfaces so as to urge said finger means against said spring means out of said gap and permit entry of the workpiece blank between said support means, said finger means being urged by said spring means into said gap to support the workpiece blank between said support means,
    said conveyor means comprising a vertical conveyor including a first pair of vertically spaced sprockets, an endless first chain trained in a loop over said vertically spaced sprockets, and a workpiece finger cantilevered from said first chain, said workpiece finger being constructed to receive a workpiece blank and to convey said workpiece blank in a vertical direction as a function of motion of said first chain,
    a horizontal conveyor including a second pair of horizontally spaced sprockets, an endless second chain trained in a loop over said horizontally spaced sprockets and a workpiece hand carried by said second chain, said workpiece hand being constructed to receive a workpiece blank and to convey said workpiece blank in a horizontal direction as a function of motion of said second chain, and
    drive means including means coupling one sprocket in each of said pairs of sprockets to a common drive mechanism and synchronizing motion of said chains such that workpieces are transmitted between said finger and said hand at the point of intersection between said horizontal and vertical directions.

2. The apparatus set forth in claim 1 wherein said drive means including means for simultaneously intermittently indexing said vertical and horizontal conveyors.

3. The apparatus set forth in claim 1, wherein said horizontal conveyor comprises a pair of horizontal chain-loops spaced from each other laterally of said horizontal direction of travel, each of said horizontal chain-loops including a chain-drive sprocket coupled to said drive means, workpiece hands being carried by said horizontal chain-loops in laterally opposed pairs.

4. The apparatus set forth in claim 3 wherein said horizontal conveyor further comprises bearing means slidably supporting each said chain in said horizontal pair.

5. The apparatus set forth in claim 3 wherein each said hand comprises multiple hand segments individually coupled to links of the corresponding said chain such that individual segments of each said hand are stationary with respect to each other as said hand travels along horizontal reaches of said chain-loops and expand with respect to each other as said chain-loops travel over said sprockets.

6. The apparatus set forth in claim 1 wherein said vertical conveyor comprises a pair of vertical chain-loops spaced from each other laterally of said vertical direction of travel, each of said vertical chain-loops including a chain-drive sprocket coupled to said drive means, workpiece fingers being carried by said vertical chain-loops in laterally opposed pairs.

7. The apparatus set forth in claim 6 wherein said vertical conveyor further comprises guide channel means positioned adjacent to each vertical reach of said vertical chain-loops, and roller bearing means cantilevered for each said vertical chain in opposition to each said workpiece finger and positioned to be received in said guide channel means.

8. An indexing conveyor for receiving and conveying workpiece blanks vertically and horizontally in sequence comprising:

a base, a pair of horizontal chain-loop conveyors respectively positioned on opposed sides of said base, each said horizontal conveyor including a drive sprocket, an idler sprocket and an endless chain trained thereover, means mounting said drive sprockets and said idler sprockets to said base on respective horizontally spaced common axes, and a plurality of uniformly spaced workpiece hands carried by each said chain in laterally opposed pairs for supporting and conveying workpieces in a horizontal direction, a pair of vertical chain-loop conveyors respectively positioned on opposite sides of said base laterally outwardly of said horizontal loop pair, each said vertical conveyor including a drive sprocket, an idler sprocket and an endless chain trained thereover, means mounting said drive sprocket and said idler sprocket to said base on respective vertically spaced common axes, and a plurality of uniformly spaced workpiece fingers carried by each said vertical chain in laterally opposed pairs for supporting and conveying workpieces in a vertical direction, drive means carried by said base including a drive shaft interconnecting all of said drive sprockets on a common drive shaft axis, a pair of opposed support means carried above said horizontal conveyors at a stacker station, said pair of support means being separated by a gap to permit stacking of workpiece blanks therebetween, finger means slidably carried by each of said support means for lateral motion with respect to said gap, each of said finger means having cam surfaces means facing said horizontal conveyors, spring means urging each said finger means into said gap, and means positioned beneath said horizontal conveyors at said stacker station for raising a workpiece blank against said cam surfaces so as to urge said finger means against force of said spring means out of said gap and permit entry of the workpiece blank between said support means, said finger means being urged by said spring means into said gap to support the workpiece blank between said support means.

* * * * *